Oct. 31, 1950             R. H. DICKE             2,527,712
ELECTRICAL APPARATUS
Filed March 8, 1945                          2 Sheets-Sheet 1
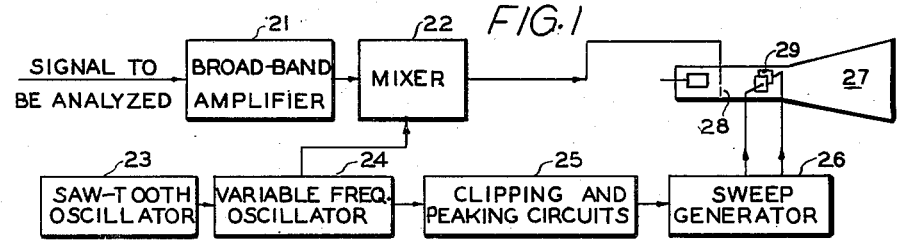
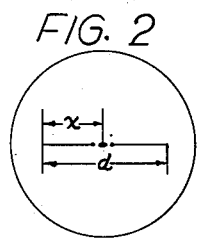
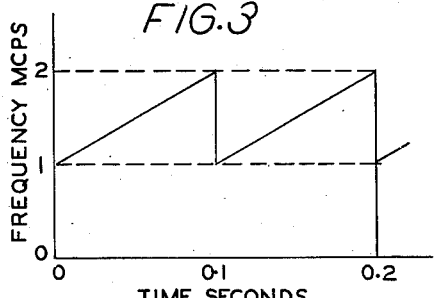
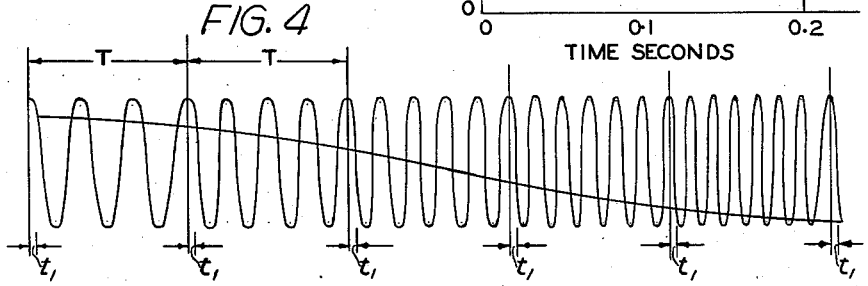
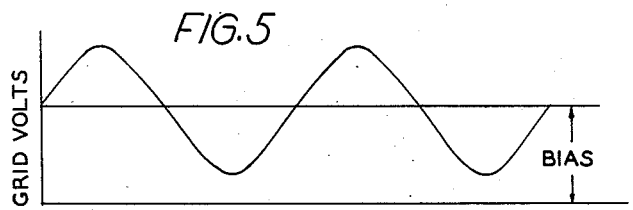
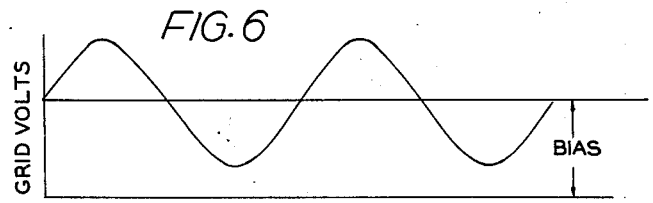
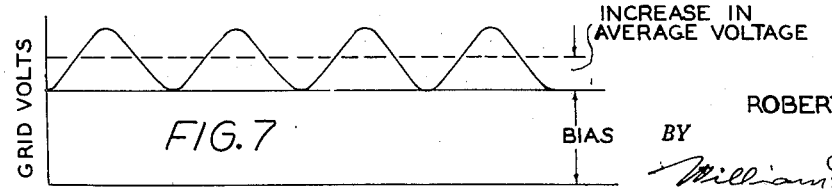
INVENTOR.
ROBERT H. DICKE
BY
William D. Hall
ATTORNEY Oct. 31, 1950 R. H. DICKE 2,527,712
ELECTRICAL APPARATUS
Filed March 8, 1945 2 Sheets-Sheet 2
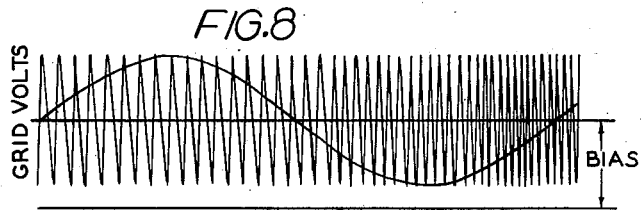
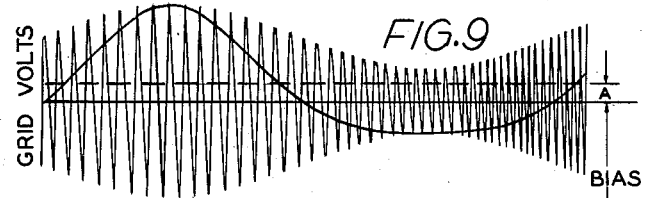
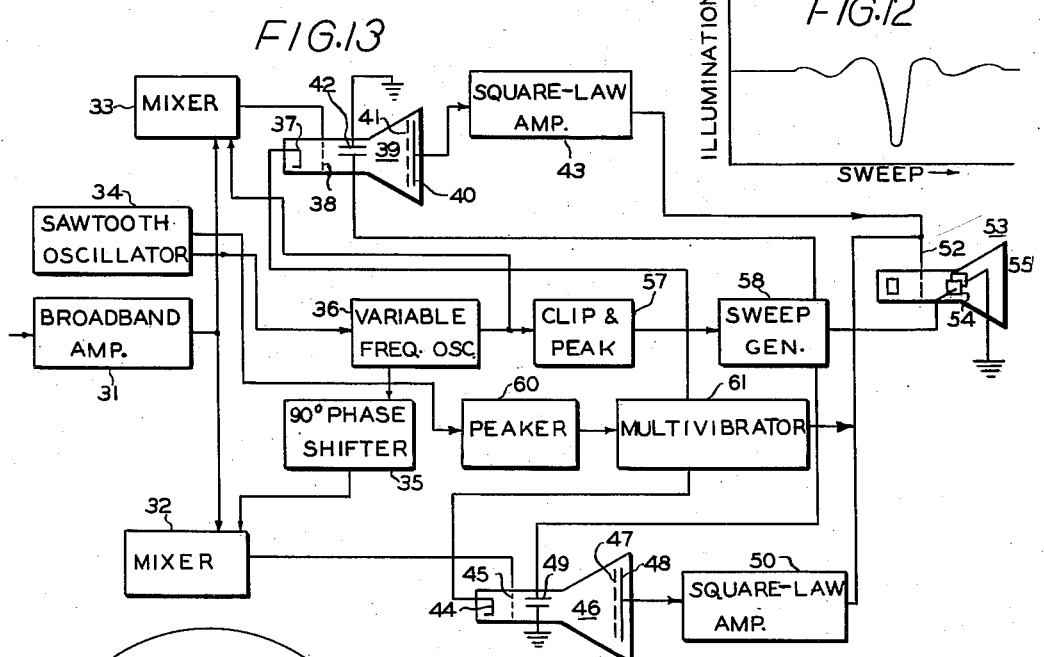
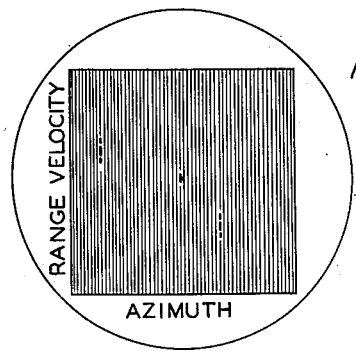
INVENTOR.
ROBERT H. DICKE
BY
ATTORNEY Patented Oct. 31, 1950

2,527,712

UNITED STATES PATENT OFFICE 2,527,712

ELECTRICAL APPARATUS

Robert H. Dicke, Cambridge, Mass., assignor, by mesne assignments, to the United States of America as represented by the Secretary of War Application March 8, 1945, Serial No. 581,696

7 Claims. (Cl. 315—9)

The present invention relates in general to electrical apparatus for monitoring all signals within a band of frequencies, and more specifically to the continuous indication of the existence of such signals.

Analyzing a band of frequencies by means of a conventional frequency analyzer ordinarily requires that the operator scan the band either manually or automatically, whereby he receives audible or other indication of the existence of only a small band of frequencies at a time as determined by the bandwidth of the amplifier. Hence, in order to monitor continuously a wide band of frequencies with conventional equipment, it would be necessary to use a large number of amplifiers tuned to adjacent frequencies.

One of the objects of this invention is to present a continuous indication of all existing signals within a wide band as changes in illumination intensity of points along a trace on the screen of a cathode-ray tube. It is also an object of this invention to distribute these light or dark spots in accordance with the frequencies of the signals in the band, so that the frequencies may be determined by means of a calibrated scale on the face of the cathode-ray tube.

These and other objects will suggest themselves to those skilled in the art and will become apparent from the following description of the invention taken in connection with the accompanying drawing in which:

Fig. 1 is a block diagram of an electronic circuit embodying the principles of this invention;

Fig. 2 is the cathode-ray tube screen;

Fig. 3 is a diagram of the time-variation of frequency of variable-frequency oscillator 24 of Fig. 1;

Figs. 4, 5, 6, 7, 8, 9, 10, 11, and 12 are drawings of waveforms used in explaining the operation of this invention;

Fig. 13 is a block diagram of a modification of the spectrum analyzer; and

Fig. 14 shows one type of indication obtainable on the screen of the cathode-ray tube.

In the specific embodiment of the invention herein described, it is desired to monitor the band from 0 to 1000 cycles per second, hereinafter referred to as the observed band. The operation of the circuit will be considered first in the absence of the observed band.

Referring now more particularly to Fig. 1, the sawtooth oscillator 23 is conventional in design, and operates at 10 cycles per second. The output of sawtooth oscillator 23 controls the frequency of variable-frequency oscillator 24 in such a way that the frequency varies from 1 megacycle to 2 megacycles per second in the manner shown in the graph of Fig. 3. Oscillators capable of such frequency variation are well known; one example being shown in Fig. 22c, p. 655, of "Radio Engineers' Handbook," written by F. E. Terman, and published by McGraw-Hill Book Company, Inc. in 1943. The frequency modulated output of oscillator 24 is applied through mixer 22 to intensity grid 28 of cathode-ray tube 27.

In the example described, sweep generator 26 is adjusted to a sweeptrace frequency of 10,000 cycles per second. The frequency modulated output from oscillator 24 is also applied through clipping and peaking circuit 25 to sweep generator 26 in the form of synchronizing pulses, so that each sweep trace is started with a predetermined phase relationship to the variable-frequency oscillator output voltage. Under these circumstances it is obviously not possible to make each successive sweep exactly $1/10{,}000$ second in duration because of the continuously-changing frequency of the synchronizing pulses. However, the high frequency (between 1 and 2 megacycles) of the synchronizing pulses makes the irregularity or jitter in the sweep duration imperceptible.

The result of impressing only the frequency-modulated signal on the intensity grid of the cathode ray tube while deflecting the beam horizontally at a frequency of 10 kc. is shown diagrammatically in Fig. 4. At the beginning of each sweep the instantaneous voltage on the intensity grid always has the same value due to synchronization with the positive peaks of the frequency-modulated signal, so that the intensity of illumination is constant at this point.

However, at any arbitrary increment of time $t_1$ after the beginning of each sweep, the phase of the intensity-grid voltage is found to be continuously advancing, in successive sweeps, due to the gradually increasing frequency. This causes the illumination intensity at a point $x$ (Fig. 2) on the sweep trace corresponding to $t_1$ to vary in a sinusoidal manner, at a frequency determined by the ratio of $t_1$ to the total sweep duration $T_t$ times the total change in frequency of the frequency-modulated signal during each sweep (in this case 1000 cycles). Thus, with no input signal, and for every point on the sweep trace, the intensity modulation of the electron beam is a cosine function, the frequency of which depends directly on the displacement of a point from the beginning of the sweep, varying from 0 at the beginning to 1000 cycles per second at the end of the sweep. The sinusoidal variation of illumination intensity at point $x$ is illustrated in Fig. 4 as a smooth curve connecting the points corresponding to $t_1$ for successive sweeps. Fig. 5 is identical to the smooth curve shown in Fig. 4, and graphically illustrates the manner in which the intensity of the electron beam in position $x$ (Fig. 2) varies over a number of sweeps.

The average value of the intensity of the electron beam is adjusted by the bias on the control grid of the cathode-ray tube and it is this which determines the normal brightness of the sweep with no signal in the observed frequency band applied. With no signal applied, the sweep intensity appears the same at all points and does not fluctuate with only oscillations of the frequency-modulated signal applied to the cathode-ray tube grid because of the persistence of the screen.

If now the observed frequency band includes a signal of some frequency between 0 and 1000 cps., say for example 500 cps., this signal is introduced into amplifier 21, and passed to mixer 22, where it is mixed with the frequency-modulated signal from the oscillator so that the mixer output is the product of the two oscillations.

The effect of this on the intensity of the sweep at the screen of the cathode-ray tube is as though the observed frequency were mixed with the illumination-intensity sinusoidal variation; the average of the product of the two oscillations is zero everywhere along the sweep trace, and hence accompanied by no change in average illumination intensity, except at the point where the two frequencies are equal, namely the center of the trace which corresponds to 500 cps.

Here there may be any one of several effects, one of which is illustrated diagrammatically in Figs. 5, 6, and 7. If the effect due to the observed signal alone at the center of the trace, as shown in Fig. 6 and the sinusoidal illumination due to the frequency-modulated signal at the center of the trace, as shown in Fig. 5, are in phase, the average of the product is positive as shown in Fig. 7 so that the average illumination increases over a small but finite length of sweep centered about the 500 cps. point. Hence, the brightness of the spot at point $x$ has accordingly increased. This effect may also be explained on the basis that the observed signal produces an amplitude modulation of the frequency-modulated signal in mixer 22. Fig. 8 is the same as Fig. 4 but drawn to a smaller time-scale, showing the frequency-modulated signal unmodulated in amplitude by the observed signal, and Fig. 9 shows the effect of the amplitude modulation to produce an additional time-invariant component in the illumination at point $x$.

If the observed signal as shown in Fig. 6 had been out of phase with the frequency of the sinusoidal sweep variation as shown in Fig. 5, a dark spot would have appeared at the 500 cps. point. Phase relationships intermediate these two extremes, such as 90°, result in a bright spot and a dark spot adjacent to the 500 cps. point.

Figs. 10, 11 and 12 are explanatory curves which illustrate the effect on the illumination of the sweep trace for the in-phase, intermediate, and out-of-phase relationships, respectively. In these curves, the integrated intensity of the electron beam, that is the brightness of the trace, is plotted as a function of the sweep position in the immediate vicinity of the 500 cps. point.

The portions of these graphs above the zero axis represent a brightening of the sweep trace, while those below represent a decrease in brightness of the sweep trace. With but the single 500 cps. signal, the brightness of the other portions of the sweep trace in the cathode-ray tube are not changed in intensity, the constructive and destructive interferences integrating out to zero over a cycle of variation of the frequency-modulated signal. Because the information obtained during a single sweep of oscillator 24 through its range of frequencies is discontinuous from that on the next sweep (the sine wave of longer period in Fig. 8 being discontinuous from sweep to sweep), the effective time of scanning each frequency in the observed band is $\frac{1}{10}$ second. This introduces spurious frequencies which give a finite width to the bright and dark interference patterns; this width may be interpreted as the bandwidth of the (fictitious) equivalent amplifier. It will be obvious to those skilled in the art that the band-width is very narrow, being closely approximated by the reciprocal of the scanning time; in this case, 10 cps.

From the foregoing discussion, it is clear that the frequency band monitored depends directly upon the rate of change of frequency of oscillator 24; that is, the number of cycles per second per sweep. Hence, a change in the frequency coverage may be effected by altering this rate of change of frequency by any one of several methods: (a) Doubling the frequency of the modulating sawtooth while maintaining the same total change of oscillator frequency will double the coverage band; (b) Doubling the total change of oscillator frequency while maintaining the same sawtooth frequency will double the coverage band; (c) Halving the sweep frequency will double the coverage band.

One modification of this invention consists in presenting the data in such a way that the appearance of the trace on the display tube will be independent of the phase relation of the observed signal with respect to the phase of the illumination at the corresponding point of the trace due to the frequency-modulated signal. All signals will appear as bright spots or dark spots as desired.

This modification is shown in Fig. 13 in which broad-band amplifier 31 receives the band of signals to be observed. The output of amplifier 31 is fed to mixers 32 and 33. Oscillator 34 produces a sawtooth wave which controls the frequency of variable-frequency oscillator 36 in the same manner as previously described with reference to Fig. 1. The output of variable-frequency oscillator 36 is applied directly to mixer 33 and to a conventional phase-shifting device 35 which shifts the phase of the output from variable-frequency oscillator 36 by 90° and applies it to mixer 32.

The output from mixer 33, which is the observed signal mixed with the frequency-modulated signal, is applied to the grid 38 of cathode-ray storage tube 39. Storage tube 39 contains means for generating an electron beam and a mosaic target consisting of signal plate 40 and photosensitive globules 41 mounted on but insulated from signal plate 40. Storage tube 39 also includes cathode 37 and plates 42 for deflecting the electron beam across the globules 41. The output from signal plate 40 is applied to amplifier 43 which has a square-law characteristic. Amplifiers having a characteristic curve such that the output varies with the square of the applied signal are well known, an example being disclosed in application 561,021, filed October 30, 1944, by France B. Berger and William A. Higinbotham issued May 11, 1948 as Patent No. 2,441,387.

In mixer 32 the observed signal is mixed with the frequency-modulated signal shifted by 90°. The output of mixer 32 is fed to grid 45 of cathode-ray storage tube 46. Storage tube 46 includes globules 47, signal plate 48, deflecting plates 49, and cathode 44, similar to the corresponding elements in storage tube 39. The output from signal plate 48 is applied to square-law amplifier 50 which is similar to square-law amplifier 43. The output of square-law amplifier 50 is added to the output of square-law amplifier 43 and applied to grid 52 of cathode-ray display tube 53. Display tube 53 also includes means for generating an electron beam, plates 54 for deflecting said beam, and a fluorescent screen 55 for making visible the trace of the electron beam.

The output of variable-frequency oscillator 36 is also fed to clipping and peaking circuit 57, the output of which is applied to sweep generator 58. The sawtooth output of sweep generator 58 is applied to deflecting plates 42, 49, and 54 of cathode-ray tubes 39, 46, and 53, respectively.

The output of sawtooth oscillator 34 is also applied to peaker circuit 60, the output of which is applied to multivibrator 61. The output of multivibrator circuit 61, a series of positive pulses, each pulse coincident in time with a peak of the sawtooth wave produced by oscillator 34, is applied to the cathodes 37 and 44 of storage tubes 39 and 46, respectively. The pulse output produced by multivibrator 61 also applies a bias to grid 52 of cathode-ray tube 53.

In the operation of the modification shown in Fig. 13, mixer 32 will produce a signal proportional to the product of the incoming signal and the sine function of the frequency-modulated signal. Mixer 33 will produce a product proportional to the observed signal and the cosine function of the frequency-modulated signal. By squaring these two product terms individually and adding the results, a signal is obtained which is proportional to the absolute magnitude of the incoming signal multiplied by the absolute magnitude of the frequency-modulated signal at any particular point along the sweep. The sweep is synchronized with the peaks of the frequency-modulated signal as produced by the variable frequency oscillator. Alternatively, the sweep may be synchronized with the peaks of the frequency-modulated wave after the 90° phase shift.

Since there is not sufficient information placed on the target by one sweep of any of the cathode-ray tubes to indicate the frequencies present, the signal supplied by mixer 33 must be accumulated over a succession of sweeps before being squared by amplifier 43 and applied to control grid 52 of display tube 53. Storage tube 39 is the means for accumulating the signal over a succession of sweeps. The electron beam in storage tube 39 is intensity modulated by the signal from mixer 33 and a charge representative of the signal is placed on globules 41. When the signal is being placed on globules 41, the cathode 37 is maintained at a sufficiently negative potential for this purpose. After a sufficient number of sweeps, cathode 37 is made more positive by the pulse supplied by multivibrator 61. This causes the sweep made at that time to remove the accumulating charges from globules 41. A signal corresponding to the charges removed from globules 41 appears at signal plate 40 and is fed to square-law amplifier 43.

Mixer 32, storage tube 46 and square-law amplifier 50 function and cooperate in a manner similar to mixer 33, storage tube 39 and square-law amplifier 43, respectively. Grid 52 of display tube 53 is normally maintained at a sufficiently negative bias so that no trace appears on screen 55. The positive pulse supplied by multivibrator 61 is also applied to grid 52 causing a visible trace to appear on screen 55 corresponding to the combined signal received from square-law amplifiers 43 and 50 during the period when charges are being removed from globules 41 and 47 of storage tubes 39 and 46, respectively.

Aside from its simple application as a frequency-measuring device, this invention might be applied to radio-echo detection systems of the Doppler type where the position of moving targets are determined by changes in frequency of received signals. Such systems ordinarily encounter considerable difficulty in the presentation of data for several simultaneous targets, and this invention provides a unique solution to this problem. The type of cathode-ray tube indication obtained is illustrated in Fig. 14, and applies for a Doppler system scanning in azimuth, presenting the azimuthal position and velocity-in-range of the targets which are shown as dark spots.

While there has been described what is at present considered to be the preferred embodiment of this invention, it will be obvious to those skilled in the art that various changes and modifications may be made therein without departing from the scope of the invention as set forth in the appended claims.

What is claimed to have been invented is:

1. In combination, a variable-frequency oscillator, a sawtooth oscillator coupled to said variable-frequency oscillator to modulate the frequency thereof, means for shifting the phase of the frequency-modulated oscillations by 90°, a first mixing circuit fed by an observed band of frequencies and the output of said variable-frequency oscillator, a second mixing circuit fed by said observed band of frequencies and the output of said variable-frequency oscillator shifted in phase by 90°, two storage means, means for applying the output of each mixer to one of said storage means, means causing each storage means to successively accumulate discrete mixer output signals over a succession of intervals, each interval being a fraction of the frequency of said sawtooth oscillator and starting at a predetermined peak of the signal produced by the variable-frequency oscillator, two separate amplifiers, each having an output characteristic such that the output varies with the square of the input signal, means for feeding the accumulated signal from each of said storage means at the peak of each oscillation produced by said sawtooth oscillator into one of said separate amplifiers, a cathode-ray tube, means for combining the output signals of said squaring amplifiers and means for impressing said combined signal on the control grid of said cathode-ray tube, said cathode-ray tube arranged to produce a trace simultaneously with the discharge of the accumulated signal from said storage means.

2. In combination, a variable-frequency oscillator, a sawtooth oscillator arranged to vary the frequency of said variable-frequency oscillator, a first mixing circuit fed by an observed band of frequencies and the output of said variable-frequency oscillator, a second mixing circuit fed by said observed band of frequencies and the output of said variable-frequency oscillator shifted in phase by 90°, means for amplifying the output of each mixing circuit in a separate amplifier, the output of which varies with the square of the input signal, means for combining the outputs of said squaring amplifiers and impressing the combined outputs on the control element of a cathode-ray tube.

3. In combination, a variable frequency oscillator, a sawtooth wave generator coupled to said variable frequency oscillator to modulate the frequency thereof, means for shifting the phase of the frequency-modulated oscillations by 90°, a first mixer to combine an observed band of frequencies and the output of said variable frequency oscillator, a first storage tube responsive to the output of said first mixer to accumulate successive outputs thereof over a succession of predetermined intervals, a second mixer to combine the output of said phase shifting means with said observed band of frequencies, a second storage tube responsive to the output of said second mixer to accumulate successive outputs thereof over a succession of said predetermined intervals, each interval being a fraction of the frequency of said sawtooth wave generator and starting at a predetermined peak of the signal produced by the variable frequency oscillator, a cathode-ray tube having a control grid and beam-deflecting means, means for generating a sweep trace between said deflecting means, the duration of each sweep trace being equal to said predetermined interval, means for discharging said storage tubes coincident in time with peaks of the sawtooth wave produced by said sawtooth generator, a first and second square law amplifier responsive to the discharged output of said first and second storage tubes respectively, means for combining the output of said amplifiers in the grid circuit of said cathode-ray tube, and means for intensifying the sweep trace on said cathode-ray tube simultaneously with the discharge of the accumulated signals from said storage tubes.

4. In combination with a cathode-ray tube having an electron beam, an intensity grid and beam-deflecting means; an oscillator, a source of signals for frequency modulating the output voltage of said oscillator; means for periodically deflecting said beam with the aid of said deflecting means to produce a linear sweep trace, the duration of said sweep trace corresponding to a predetermined portion of the frequency variation of said output voltage, a connection between said source and said grid for impressing said frequency-modulated voltage on said intensity grid to control the average intensity of said sweep trace, means for synchronizing the start of each sweep trace with predetermined peaks of said frequency-modulated voltage whereby the intensity of corresponding points on successive sweep traces is sinusoidally varied, the frequency of the sinusoidal variation successively increasing with the displacement of said corresponding points from the beginning of each sweep, said connection including means for combining a signal to be analyzed with the output of said frequency-modulated voltage in the intensity grid circuit to produce an abrupt change in the intensification of the sweep trace at that point where the frequency of said sinusoidal variation is substantially the same as the frequency of said signal.

5. In combination with a cathode-ray tube having an electron beam, an intensity grid, and beam-deflecting means; a first sawtooth generator, a variable frequency oscillator responsive to the output of said first sawtooth generator to produce frequency-modulated output voltages, a second sawtooth generator connected across said beam-deflecting means to produce a periodic linear sweep trace, the duration of said sweep trace corresponding to a predetermined portion of the frequency variation of said modulated output voltage, means for impressing said frequency-modulated voltage on said intensity grid to control the average intensity of said sweep trace, means for synchronizing the start of each sweep trace with predetermined peaks of said frequency-modulated voltage whereby the intensity of corresponding points on successive sweep traces is sinusoidally varied, the frequency of said sinusoidal variation successively increasing with the displacement of said corresponding points from the beginning of each sweep, and a mixer circuit, including said first mentioned means, for combining a signal to be analyzed with the output of said frequency-modulated voltage and having its output applied to the intensity grid of said cathode-ray tube to produce a change in the intensification of the sweep trace at that point where the frequency of said sinusoidal variation is substantially the same as the frequency of said signal.

6. In combination with a cathode-ray tube having an electron beam, an intensity grid, and beam-deflecting means; an oscillator, means for repeatedly and cyclically varying the frequency of the output voltage of said oscillator, means for repeatedly and cyclically deflecting said beam between said deflecting means to produce a periodic linear sweep trace, the period of said sweep trace producing means corresponding to a predetermined portion of the frequency variation of said oscillator voltage, a connection between the output of said oscillator and said grid for impressing said frequency varied voltage on said intensity grid to control the average intensity of said sweep trace, means for synchronizing the start of each sweep trace with predetermined peaks of said frequency varied voltage whereby the intensity of corresponding points on successive sweep traces is sinusoidally varied, the frequency of the sinusoidal variation successively increasing with the displacement of said corresponding points from the beginning of each sweep trace, said connection including means for combining a signal to be analyzed with the output of said frequency-modulated voltage in the intensity grid circuit to produce an abrupt change in the intensification of the sweep trace at that point where the frequency of said sinusoidal variation is substantially the same as the frequency of said input signal.

7. The device set forth in claim 6, wherein the cyclic variations of the sweep producing means is higher than the cyclic variations of the frequency modulating means.

ROBERT H. DICKE.

REFERENCES CITED

The following references are of record in the file of this patent:

UNITED STATES PATENTS

| Number | Name | Date |
|---|---|---|
| Re. 22,150 | Bagno et al. | Aug. 4, 1942 |
| 2,131,886 | Francis | Oct. 4, 1938 |
| 2,234,830 | Norton | Mar. 11, 1941 |
| 2,243,234 | Von Duhn | May 27, 1941 |
| 2,269,226 | Rohats | Jan. 6, 1942 |
| 2,280,531 | Norgaard | Apr. 21, 1942 |
| 2,292,045 | Burnett | Aug. 4, 1942 |
| 2,363,810 | Schrader et al. | Nov. 28, 1944 |
| 2,387,685 | Sanders | Oct. 23, 1945 |

FOREIGN PATENTS

| Number | Country | Date |
|---|---|---|
| 552,072 | Great Britain | Mar. 22, 1943 |